United States Patent
Wang et al.

(10) Patent No.: US 12,529,929 B2
(45) Date of Patent: Jan. 20, 2026

(54) ELECTRONIC DEVICE

(71) Applicant: InnoLux Corporation, Miao-Li County (TW)

(72) Inventors: Ming-Tien Wang, Miao-Li County (TW); Chin-Tu Tsai, Miao-Li County (TW); Chih-Hung Hsu, Miao-Li County (TW); Chih-Hung Liu, Miao-Li County (TW); Hsiang-Yu Juan, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 0 days.

(21) Appl. No.: 18/734,097

(22) Filed: Jun. 5, 2024

(65) Prior Publication Data

US 2024/0319539 A1    Sep. 26, 2024

Related U.S. Application Data

(63) Continuation of application No. 18/465,621, filed on Sep. 12, 2023, now Pat. No. 12,044,928, which is a continuation of application No. 17/950,581, filed on Sep. 22, 2022, now Pat. No. 11,860,477, which is a continuation of application No. 17/410,456, filed on Aug. 24, 2021, now Pat. No. 11,487,156.

(30) Foreign Application Priority Data

Sep. 14, 2020    (CN) .......................... 202010959118.2

(51) Int. Cl.
*G02F 1/00*    (2006.01)
*G02F 1/13357*    (2006.01)

(52) U.S. Cl.
CPC .. *G02F 1/133608* (2013.01); *G02F 1/133605* (2013.01)

(58) Field of Classification Search
CPC .................................. G02F 1/133602–133615
See application file for complete search history.

(56) References Cited

U.S. PATENT DOCUMENTS

| | | | |
|---|---|---|---|
| 10,670,919 B2 * | 6/2020 | Yamano | G02F 1/133606 |
| 2006/0104080 A1 | 5/2006 | Kim et al. | |
| 2007/0103908 A1 * | 5/2007 | Tabito | G02F 1/133608 |
| | | | 362/240 |
| 2011/0187945 A1 | 8/2011 | Kuromizu | |

(Continued)

FOREIGN PATENT DOCUMENTS

| | | |
|---|---|---|
| CN | 101441362 B | 12/2010 |
| CN | 106200126 A | 12/2016 |

OTHER PUBLICATIONS

JP 2017 Product catalog, p. 29, ("Catalog") available at https://web.archive.org/web/20180901050513/http://plabane.co.ip/pdf/2017chemi.pdf (Year 2017).

*Primary Examiner* — Gerald J Sufleta, II
(74) *Attorney, Agent, or Firm* — MUNCY, GEISSLER, OLDS & LOWE, P.C.

(57) ABSTRACT

An electronic device includes: a back plate; an optical film disposed on the back plate; a support module disposed between the back plate and the optical film; and an adhesive layer disposed between the back plate and the support module, wherein the support module includes a base and a support unit between the base and the optical film, and the base is fixed to the back plate by the adhesive layer.

13 Claims, 4 Drawing Sheets

(56) References Cited

U.S. PATENT DOCUMENTS

| | | | |
|---|---|---|---|
| 2012/0086885 A1* | 4/2012 | Yokota | G02F 1/133605 |
| | | | 362/296.01 |
| 2012/0120324 A1* | 5/2012 | Yoshikawa | G02F 1/133608 |
| | | | 348/739 |
| 2013/0093964 A1 | 4/2013 | Kuroda | |
| 2014/0029296 A1 | 1/2014 | Masuda | |
| 2014/0268738 A1* | 9/2014 | Chan | F21V 7/0083 |
| | | | 29/428 |
| 2015/0055052 A1 | 2/2015 | Tanabe | |
| 2017/0105296 A1 | 4/2017 | Huang et al. | |
| 2018/0284934 A1 | 10/2018 | Wu et al. | |
| 2022/0082888 A1 | 3/2022 | Wang et al. | |
| 2023/0066479 A1 | 3/2023 | Wang et al. | |

* cited by examiner

ELECTRONIC DEVICE

CROSS REFERENCE TO RELATED APPLICATION

This application claims the benefits of the Chinese Patent Application Serial Number 202010959118.2, filed on Sep. 14, 2020, the subject matter of which is incorporated herein by reference.

This application is a continuation (CA) of U.S. Patent application for "ELECTRONIC DEVICE", U.S. application Ser. No. 18/465,621 filed on Sep. 12, 2023; U.S. application Ser. No. 18/465,621 is a continuation (CA) of U.S. application Ser. No. 17/950,581 filed on Sep. 22, 2022; U.S. application Ser. No. 17/950,581 is a continuation (CA) of U.S. application Ser. No. 17/410,456 filed on Aug. 24, 2021; and the subject matter of which is incorporated herein by reference.

BACKGROUND

1. Field

The present disclosure relates to an electronic device and, more particularly, to an electronic device with an improved support module.

2. Description of Related Art

With the rapid advancement of display devices manufacturing technology, as well as its advantages of lightweight, thinness, power saving, and being free of radiation, the display devices have been widely applied in various electronic products such as tablet computers, notebook computers, digital cameras, digital video recorders, mobile phones, computer monitors and LCD televisions.

Moreover, with the advancement of technology to meet consumer demand, various types of display devices have gradually been developed on the market. At present, in the mainstream of display devices, direct-type backlight modules are adopted. There is a support module between the optical film and the back plate in the direct-type backlight module to form a chamber in which the light-emitting elements can be arranged.

Generally, it needs to install a plurality of support modules between the backlight module and the display panel or between the backlight module and the optical plate, such as the diffuser, to maintain the liquid crystal panel or optical plate at a fixed level height.

However, to support the display panel, the typical support module may break the glass screen above the backlight module due to having high rigidity when the product is squeezed, bumped or dropped during the transportation process. In addition, the support module is generally made by double-shot injection, and the cost is relatively high.

Therefore, there is a need to provide an improved backlight module to increase the reliability or reduce the cost.

SUMMARY

In view of this, the present disclosure provides an electronic device having an improved support module to achieve the purpose of increasing reliability or reducing cost.

To achieve the object, the present disclosure provides an electronic device, which includes: a back plate; an optical film disposed on the back plate; a support module disposed between the back plate and the optical film; and an adhesive layer disposed between the back plate and the support module, wherein the support module comprises a base and a support unit between the base and the optical film, and the base is fixed to the back plate by the adhesive layer.

The present disclosure also provides an electronic device, which includes: a back plate; an optical film disposed on the back plate; and a support module disposed between the back plate and the optical film, wherein the support module comprises a base and a support unit between the base and the optical film, the base comprises a first hole offset from a center of the base for fixing the support module to the back plate, and in a side view, the support unit has a first width at a top position away from the back plate and a second width at a bottom position closer to the back plate, and the second width is greater than the first width.

Other novel features of the disclosure will become more apparent from the following detailed description when taken in conjunction with the accompanying drawings.

DETAILED DESCRIPTION OF EMBODIMENT

The following provides different embodiments of the present disclosure. These embodiments are used to illustrate the technical content of the present disclosure, rather than to limit the claims of the present disclosure. A feature of one embodiment can be applied to other embodiments through suitable modification, substitution, combination, and separation.

It should be noted that, in the specification and claims, unless otherwise specified, having "one" element is not limited to having a single said element, but one or more said elements may be provided.

In addition, in the specification and claims, unless otherwise specified, ordinal numbers, such as "first" and "second", used herein are intended to distinguish components rather than disclose explicitly or implicitly that names of the components bear the wording of the ordinal numbers. The ordinal numbers do not imply what order a component and another component are in terms of space, time or steps of a manufacturing method. A "first" element and a "second" element may appear together in the same component, or separately in different components. The existence of an element with a larger ordinal number does not necessarily mean the existence of another element with a smaller ordinal number.

In this disclosure, the term "almost", "about", "approximately" or "substantially" usually means within 20%, 10%, 5%, 3%, 2%, 1% or 0.5% of a given value or range. The quantity the given value is an approximate quantity, which means that the meaning of "almost", "about", "approximately" or "substantially" may still be implied in the absence of a specific description of "almost", "about", "approximately" or "substantially".

In addition, the positions mentioned in the specification and claims, such as "over", "on" or "above", may mean that the two elements are in direct contact, or may mean that the two elements are in direct contact.

Similarly, the positions mentioned in the specification and claims, such as "under", "below" or "beneath", may mean that the two elements are in direct contact, or may mean that the two elements are in direct contact.

In addition, if a value is between a first value and a second value, the value may be the first value, the second value, or another value between the first value and the second value.

The detailed structure of the backlight module of the present disclosure will be described in detail below, but the present disclosure is not limited to the following exemplary embodiments. The embodiments of the present disclosure may be combined with each other or combined with other known structures to form another embodiment.

EMBODIMENTS

Figure 1A:
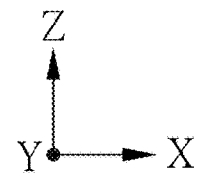
FIG. 1A is a side view of the backlight module of the present disclosure.
Figure 1A:
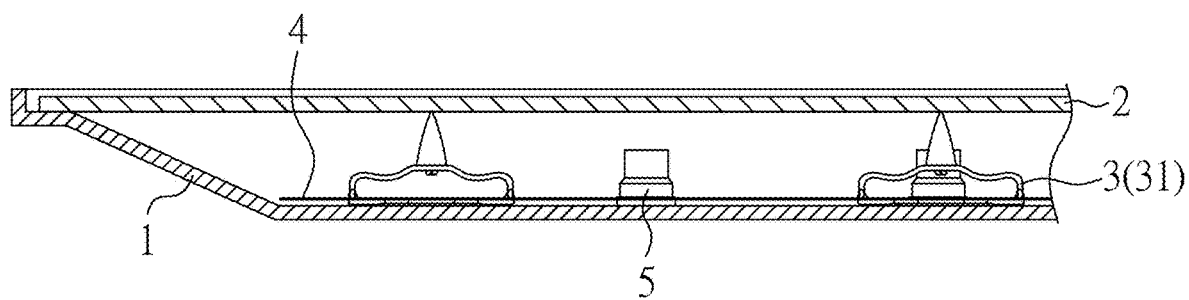

FIG. 1A is a side view of the backlight module of the present disclosure. As shown in FIG. 1A, the backlight module of the present disclosure includes: a back plate 1; an optical film 2 disposed on the back plate 1; and a support module 3 disposed on the back plate 1 and between the back plate 1 and the optical film 2. The support module 3 includes a base 31, and the elasticity coefficient of the base 31 is between 0.4-0.6 kgf/mm. By providing the support module 3 disposed between the back plate 1 and the optical film 2, the present disclosure is able to achieve the effect of supporting the optical film 2. Moreover, since the elasticity coefficient of the base 31 of the support module 3 is between 0.4-0.6 kgf/mm, the reliability of the backlight module can be improved.

In the present disclosure, the material of the back plate 1 is not particularly limited. For example, it may be metal, alloy, plastic material, or a combination thereof. The optical film 2 may be a light guide plate, a diffuser plate, a brightness enhancement film, or a combination thereof, but the present disclosure is not limited thereto. In another embodiment of the present disclosure, the optical film 2 may be integrated into a composite optical film with functions of light guide, brightness enhancement, and so on.

As shown in FIG. 1A, the backlight module of the present disclosure further includes a reflective sheet 4 disposed on the back plate 1. The reflective sheet 4 may help to reflect a light from light source and improve the efficiency of display devices, but not limited herein. More specifically, the reflective sheet 4 includes an opening (not shown), and the opening is arranged corresponding to the support module 3 so that the reflective sheet 4 may be disposed on the back plate 1 by allowing the support module to pass through the opening. The material of the reflective sheet 4 is not particularly limited and, for example, it can be metal (e.g. silver, aluminum), polyimide, white ink, resin, or a combination thereof.

Figure 1B:
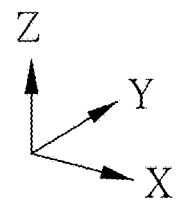
FIG. 1B is a schematic diagram of the backlight module of the present disclosure.
Figure 1B:
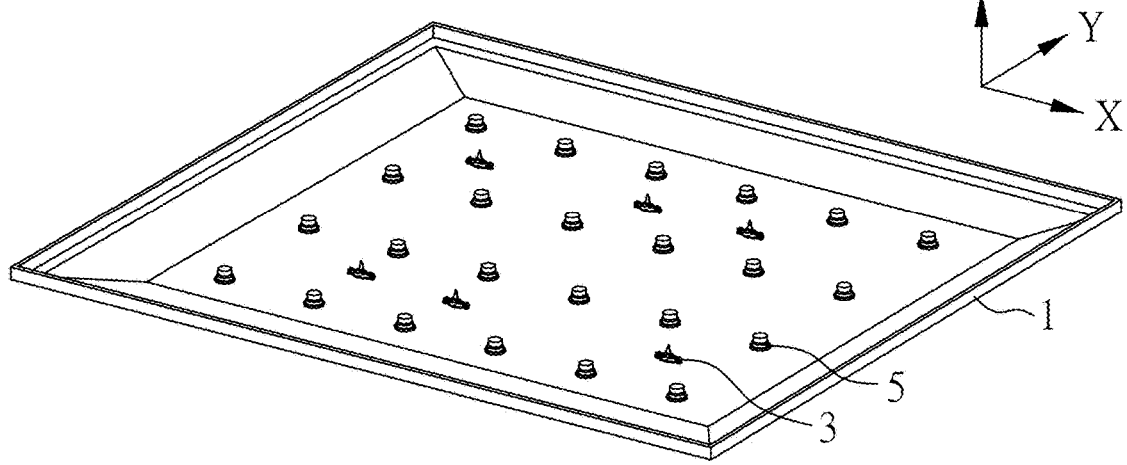

FIG. 1B is a schematic diagram of the backlight module of the present disclosure. For the convenience of description, some components, such as the optical film 2 and the reflective sheet 4, are omitted in FIG. 1B. As shown in FIGS. 1A and 1B, the backlight module of the present disclosure further includes a light source 5 disposed on the back plate 1 and, more specifically, the light source 5 is disposed in the chamber formed by the optical film 2 and the back plate 1. In the normal direction of the back plate 1 (i.e., the Z-direction), the projection of the light source 5 on the back plate 1 and the projection of the support module 3 on the back plate 1 do not overlap. Therefore, the adverse effect of the support module 3 on the optical taste can be reduced.

In the present disclosure, the number of support modules 3 is not particularly limited and, provided that the projection of the light source 5 on the back plate 1 and the projection of the support module 3 on the back plate 1 do not overlap, the position where the support module 3 is disposed may be adjusted according to the need of the optical design. The detailed structure of the support module 3 will be described in detail below.

Figure 2A:
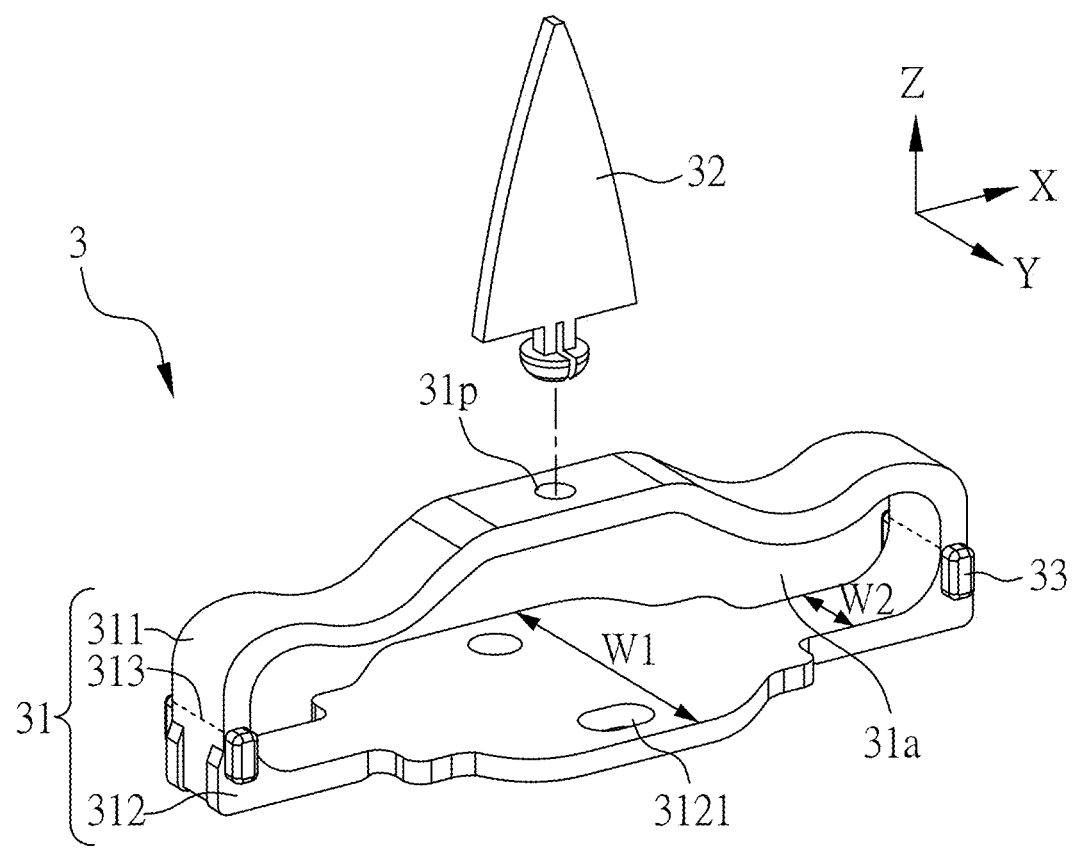
FIG. 2A is a perspective view of the support module according to an embodiment of the present disclosure.
Figure 2B:
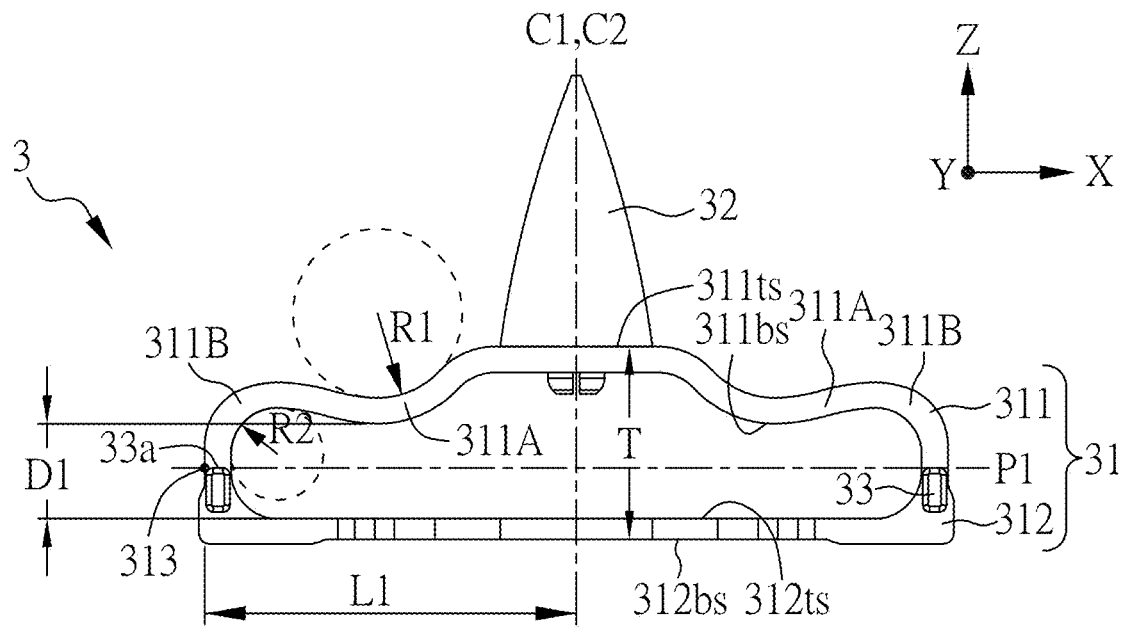
FIG. 2B is a side view of the support module according to an embodiment of the present disclosure.

FIG. 2A is a perspective view of the support module 3 according to an embodiment of the present disclosure, and FIG. 2B is a side view of the support module 3 according to an embodiment of the present disclosure. As shown in FIG. 2A, the support module 3 includes a base 31 and a support unit 32, wherein the base 31 has a hollow structure 31a and a perforation 31p, and the support unit 32 and the base 31 are assembled through the perforation 31p on the base 31 so as to form the support module 3. In detail, the support unit 32 is fixed to the base 31 through the perforation 31p on the base 31 to form a support module 3. When a force is applied to the support module 3, since the base 31 has a hollow structure 31a, the hollow structure 31a is able to provide a buffer space for reducing the possibility that the support module 3 is damaged or the support module 3 breaks other components above it, so as to improve reliability of the display devices.

In the present disclosure, the material of the support module 3 may include a polymer, for example, poly(methyl methacrylate), polycarbonate, poly(ethylene terephthalate), acrylonitrile-styrene copolymer, etc. However, the present disclosure is not limited thereto. In addition, the base 31 and the support unit 32 may be made of the same or different materials. In the present disclosure, in order to reduce the adverse effect of the support module 3 on the optical taste, the light transmittance T of the support module 3 is larger or equal to 80% and small or equal to 95% (i.e., 80%≤T≤95%), or the light transmittance T of the support module 3 is larger or equal to 85% and small or equal to 90% (i.e., 85%≤T≤90%), but the present disclosure is not limited thereto.

In the embodiment of the present disclosure, the base 31 and the support unit 32 are not integrally formed. Therefore, based on the product requirements, the support unit 32 can be adjusted or replaced with a suitable one according to the distance between the back plate 1 and the optical film 2 in the backlight module. In addition, since the base 31 and the support unit 32 are not integrated into one piece through double-shot injection, the cost can be reduced.

As shown in FIG. 2A, the base 31 includes a first part 311 and a second part 312, wherein the first part 311 and the second part 312 are connected to form a hollow structure 31a, and the support unit 32 and the first part 311 of the base 31 are assembled through, for example, the perforation 31p. In the present disclosure, a shape of the perforation 31p may include circle, semi-circle, ellipse, semi-ellipse, a combination thereof, or other suitable shape, but the present disclosure is not limited thereto. The base 31 further includes a positioning component 33, and the positioning component 33 is connected to the second part 312. The positioning component 33 has a side edge 33a, and the side edge 33a is such a side edge of the positioning component 33 that is away from the back plate 1 along a direction parallel to the normal line of the back plate 1 (i.e., the Z-direction). Thus, an extension line P1 of the side edge 33a can be obtained along the normal direction of the back plate 1 (i.e., the Z direction) and through the side edge 33*a*. More specifically, as shown in FIG. 2B, the base 31 has an extension line P1 perpendicular to the normal direction of the back plate 1 (i.e., the Z-direction) and, viewed from the side view direction of the support module 3, the first part 311 and the second part 312 are respectively disposed on two sides of the extension line P1, and the extension line P1 passes through the outer junctions 313 of the first part 311 and the second part 312. In this embodiment, the extension line P1 passes through half of the maximum thickness T of the base 31, wherein the maximum thickness T is the maximum distance from a top surface 311*ts* of the first part 311 of the base 31 to a bottom surface 312*bs* of the second part 312 of the base 31 in the normal direction of the back plate 1 (i.e., the Z-direction), but the present disclosure is not limited thereto.

As shown in FIG. 2B, the first part 311 has a curved structure, and the curvature radius of the curved structure is between 4-8 mm. More specifically, in one embodiment of the present disclosure, the curved structure includes two recessed portions 311A and two arc portions 311B, wherein the two recessed portions 311A are respectively disposed on two sides of the support unit 32, and are respectively connected to the two arc portions 311B. The two arc portions 311B are respectively connected to the second part 312. The curvature radius R1 of each of the two recessed portions 311A is greater than or equal to 6 mm and smaller than or equal to 8 mm (i.e., $6 \leq R1 \leq 8$ mm), and the curvature radius R2 of each of the two arc portions 311B is greater than or equal to 4 mm and smaller than or equal to 6 mm (i.e., $4 \leq R2 \leq 6$ mm).

In the present disclosure, the "recessed portion" refers to a portion formed by the first part 311 bent in a direction toward to the back plate 1, and the "arc portion" refers to an arc-shaped area in the first part 311 that is connected to one of the recessed portions 311A and the second part 312. In other embodiments of the present disclosure, the curved structure may include more than two recessed portions 311A.

In addition, in the normal direction of the back plate 1 (i.e., the Z-direction), the distance from the lowest point of one of the recessed portions 311A to the second part 312 is defined as a first distance D1. More specifically, the first distance D1 is the shortest distance from a bottom surface 311*bs* of the first part 311 to a top surface 312*ts* of the second part 312 in the normal direction of the back plate 1 (i.e., the Z-direction). In the length direction of the base 31, half of the length of the first part 311 is defined as a first length L1. More specifically, in this embodiment, the length direction of the base 31 is parallel to the length direction of the back plate 1. Therefore, the first length L1 is half of the length of the base 31 in the length direction of the back plate 1 (i.e., the X-direction). The ratio of the first distance D1 to the first length L1 may be greater than or equal to 0.23 and smaller than or equal to 0.37 (i.e., $0.23 \leq \text{ratio} \leq 0.37$), for example, greater than or equal to 0.23 and smaller than or equal to 0.25 (i.e., $0.23 \leq \text{ratio} \leq 0.25$), but the present disclosure is not limited thereto. Therefore, the connection between the recessed portion 311A and the arc portion 311B referred to in the present disclosure may be regarded as the highest point of the recessed portion 311A located at the top surface 311*ts* of the first part 311. More specifically, the connection between the recessed portion 311A and the arc portion 311B may be regarded as the inflection point between the recessed portion 311A and the arc portion 311B. In addition, the curvature radius R1 of the recessed portion 311A in the present disclosure may be substantially regarded as the radius of a tangent circle at the lowest point of the top surface 311*ts* of the first part 311 through the recessed portion 311A. The curvature radius R2 of the arc portion 311B may be substantially regarded as the radius of a tangent circle at the highest point of the bottom surface 311*bs* of the first part 311 through the arc portion 311B.

In another embodiment of the present disclosure, since the position where the support module 3 is arranged may be adjusted according to the requirements of the optical design, the length direction of the base 31 of the support module 3 may also be parallel to the Y-direction, although not shown in the figure, wherein the Y-direction is perpendicular to the normal direction of the back plate 1 (i.e., the Z-direction). Therefore, the first length L1 may be half of the maximum length of the base 31 in a direction perpendicular to the normal direction of the back plate 1. However, the present disclosure is not limited to this. In other embodiments of the present disclosure, the length direction of the base 31 of the support module 3 may be parallel to other directions.

In the present disclosure, the support module 3 is substantially symmetrical. Therefore, as shown in FIG. 2B, the base 31 may have a first symmetry axis C1, and the support unit 32 may have a second symmetry axis C2, wherein the first symmetry axis C1 and the second symmetry axis C2 are parallel to the normal direction of the back plate 1 (i.e., the Z-direction), and the first symmetry axis C1 and the second symmetry axis C2 may substantially coincide. In another embodiment of the present disclosure, the first length L1 may be defined as the distance between the first symmetry axis C1 of the base 31 and the outer junction 313.

In the present disclosure, the second part 312 of the base 31 may fix the support module 3 to the back plate 1 by an adhesive layer (not shown) and, in order to increase the adhering ability between the second part 312 and the adhesive layer, the second part 312 may have a design with unequal widths, thereby increasing the contact area between the second part 312 and the adhesive layer. In more detail, as shown in FIG. 2A, the width of the second part 312 along the direction perpendicular to the normal direction of the back plate 1 (i.e., along the Y direction) may not be equal; that is, along a direction perpendicular to the normal direction of the back plate 1 (i.e., along the Y-direction), the width W1 of the second part 312 may be different from the width W2 thereof, but the present disclosure is not limited thereto. In another embodiment of the present disclosure, there may be no adhesive layer provided between the support module 3 and the back plate 1 and, instead, the support module 3 is fixed on the back plate 1 through other fixing elements. As shown in FIG. 2A, the second part 312 may further include a plurality of holes 3121, and the support module 3 may be fixed to the back plate 1 by inserting fixing components such as screws into the plurality of holes 3121, but the present disclosure is not limited thereto.

In another embodiment of the present disclosure, as shown in FIGS. 2A and 2B, the positioning component 33 may be used to position the reflective sheet 4, but the present disclosure is not limited thereto. When the reflective sheet 4 is assembled on the back plate 1, the support module 3 passes through the opening on the reflective sheet 4, which means that the opening of the reflective sheet 4 is arranged corresponding to the support module 3, so as to arrange the reflective sheet 4 under the positioning component 33 thereby achieve the positioning purpose.

Figure 3A:
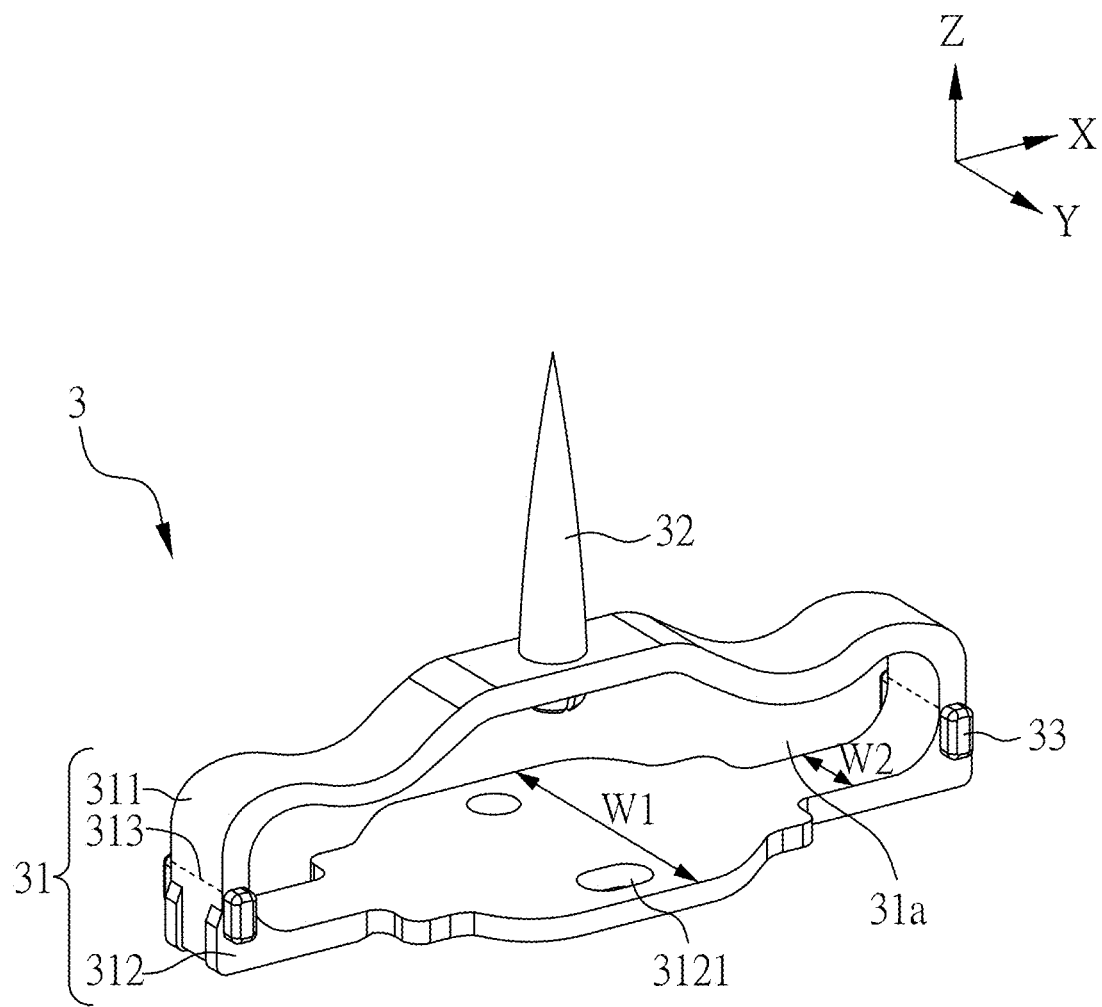
FIG. 3A is a perspective view of the support module according to another embodiment of the present disclosure.

FIG. 3A is a side view of the support module according to another embodiment of the present disclosure, wherein the support module 3 of FIG. 3A is similar to that of FIG. 2A, except for the following differences.

As shown in FIG. 2A, the support unit 32 of the support module 3 of FIG. 2A has a flat triangular shape, while the support unit 32 of the support module 3 of FIG. 3A has a conical shape, but the present disclosure is not limited thereto. The shape of the support unit 32 may be adjusted or replaced according to the requirements of the optical design or the manufacturing process. Furthermore, a shape of a top of the support unit 32 could be sharp, flat or curved, but the present disclosure is not limited thereto.

Figure 3B:
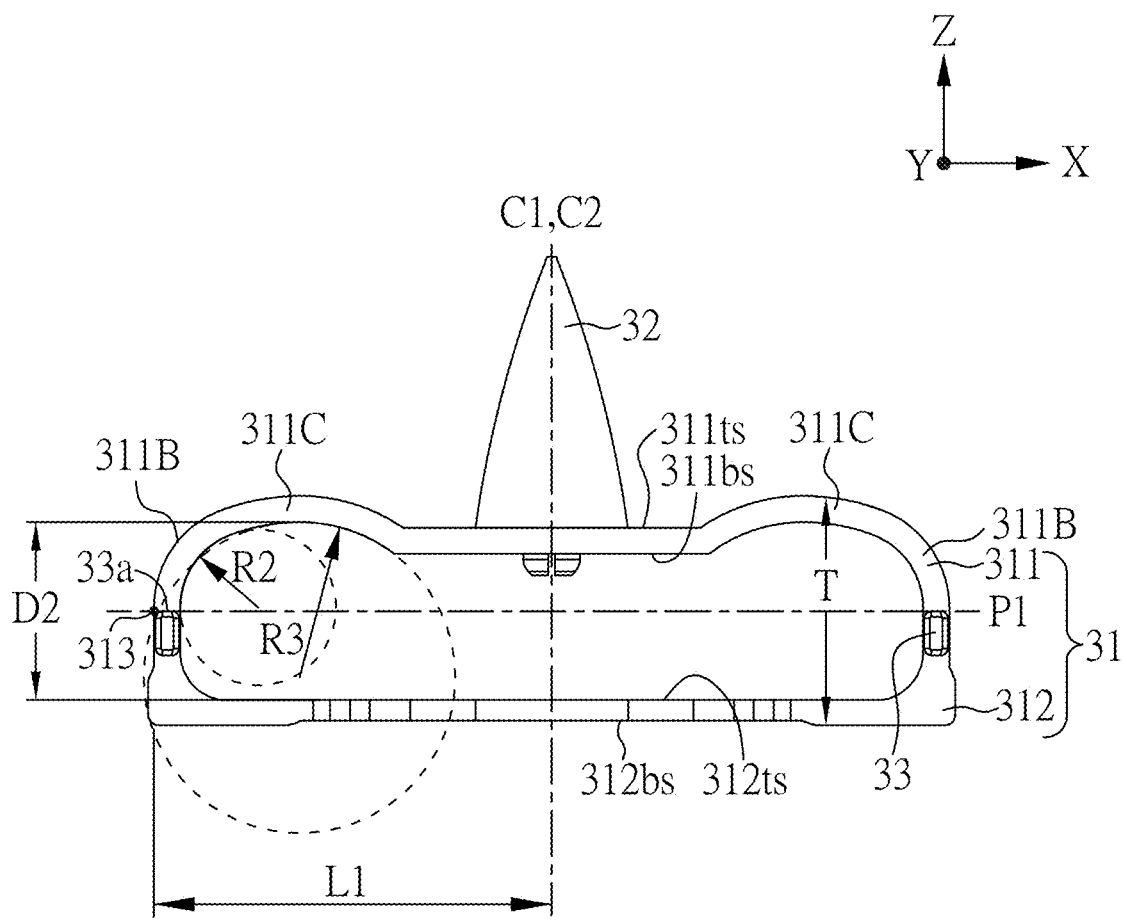
FIG. 3B is a side view of the support module according to another embodiment of the present disclosure.

FIG. 3B is a side view of the support module according to another embodiment of the present disclosure, wherein the support module 3 of FIG. 3B is similar to that of FIG. 2B, except for the following differences.

As shown in FIG. 2B, the first part 311 of the base 31 in FIG. 2B has a curved structure, and the curved structure includes two recessed portions 311A and two arc portions 311B, while the curved structure of the first part 311 of FIG. 3B includes two protruding portions 311C and two arc portions 311B, wherein the two protruding portions 311C are respectively disposed on two sides of the support unit 32 and are respectively connected to the two arc portions 311B, and the two arc portions 311B are respectively connected to the second part 312. The curvature radius R3 of each of the two protruding portions 311C is greater than or equal to 6 mm and smaller than or equal to 8 mm (i.e., 6≤R3≤8 mm), and the curvature radius R2 of each of the two arc portions 311B is greater than or equal to 4 mm and smaller than or equal to 6 mm (i.e., 4≤R2≤6 mm).

In the present disclosure, the "protruding portion" refers to a portion formed by the first part 311 protruding in a direction away from the back plate 1, and the "arc portion" refers to an arc-shaped area in the first part 311 that is connected to one of the protruding portions 311C and the second part 312. In other embodiments of the present disclosure, the curved structure may include more than two protruding portions 311C.

As shown in FIG. 3B, in the normal direction of the back plate 1 (i.e., the Z-direction), the distance from the highest point of one of the protruding portion 311C to the second part 312 is defined as a second distance D2. More specifically, the second distance D2 is the longest distance from the bottom surface 311bs of the first part 311 to the top surface 312ts of the second part 312 in the normal direction of the back plate 1 (i.e., the Z-direction). In the present disclosure, the highest point of a protruding portion means that the protruding portion is farthest from the back plate 1 in the normal direction of the back plate 1 (i.e., the Z-direction). The ratio of the second distance D2 to the first length L1 may be greater than or equal to 0.23 and smaller than or equal to 0.37 (i.e., 0.23≤ratio≤0.37), for example, greater than or equal to 0.25 and smaller than or equal to 0.37 (i.e., 0.25≤ratio≤0.37), but the present disclosure is not limited thereto.

Through the design of the present disclosure, the base 31 of the support module 3 is a hollow structure 31a capable of providing a buffer space, which means that the support module 3 of the present disclosure has an elasticity coefficient greater than or equal to 0.4 kgf/mm and smaller than or equal to 0.6 kgf/mm, thereby reducing the possibility that the support module 3 is damaged by external force or the support module 3 breaks other components above it due to external force. The elasticity coefficient of the present disclosure is measured by a universal testing machine, but the method for obtaining the elasticity coefficient is not limited thereto. The universal testing machine is used to test the relationship between the displacement and the load of the support module 3 in FIG. 2A, so as to obtain the elasticity coefficient after conversion. The second part 312 of the base 31 of the support module 3 in FIG. 2A is fixed on a load-applying head of the universal testing machine, and a glass sample (40 mm×40 mm×1 mm) is placed flat on a testing jig of the universal testing machine. The support unit 32 of the support module 3 is aligned with the center of the testing jig, and the universal testing machine is pressed at a moving speed of 5 mm/min, so that the support module 3 of FIG. 2A contacts the glass sample until the glass sample is broken or the load of the glass sample is reduced by 10%. The experimental result shows that the elasticity coefficient of the base 31 is greater than or equal to 0.4 kgf/mm and smaller than or equal to 0.6 kgf/mm. Therefore, it can be seen that, when pressure is applied, the support module 3 of the present disclosure has a better buffer space and less reaction force in comparison with the typical support module, which can improve the reliability of the backlight module and reduce the risk of cracking the glass screen on the backlight module.

In summary, since the support module 3 of the present disclosure has a special structural design, more specifically, the base 31 of the support module 3 has a hollow structure 31a, the reliability of the backlight module can be improved or the risk of breaking can be reduced.

In the present disclosure, the backlight module manufactured in the aforementioned embodiments may be arranged corresponding to a display panel to form a display device, a light-emitting device or a free shape display, but it is not limited thereto. The display devices may include light-emitting diodes, liquid crystal, fluorescence, phosphors, other suitable display media or combinations of the above, but not limited herein. The light-emitting diodes may, for example, include inorganic light-emitting diodes (LEDs), mini-light-emitting diodes (mini LEDs, millimeter sized LEDs), micro-light-emitting diodes (micro-LEDs, micrometer sized LEDs), quantum dots (QDs) light-emitting diodes (e.g. QLEDs or QDLEDs), other suitable light-emitting diodes or any combination of the above, but the present disclosure is not limited thereto. The display device can be a bendable or flexible display device. The display device may include, for example, a tiled display device, but is not limited thereto. In addition, the shape of the display device may be rectangular, circular, polygonal, a shape with curved edges, or other suitable shapes. The display device may have a driving system, a control system, a light source system, a shelf system or other peripheral systems to support the display device or tiled display device. Furthermore, the display device may be applied to any known electronic device that needs a display screen for displaying images, such as displays, mobile phones, notebook computers, video recorders, cameras, music players, mobile navigation devices, televisions, and so on.

The aforementioned specific embodiments should be construed as merely illustrative, and not restricting the rest of the present disclosure in any way, and the features between different embodiments can be mixed and matched as long as they do not conflict with each other.

What is claimed is:
1. An electronic device, comprising:
a back plate comprising a top surface;
an optical film disposed on the back plate;
a support module disposed between the back plate and the optical film; and
an adhesive layer disposed between the back plate and the support module, wherein the support module comprises a base and a support unit between the base and the optical film, and the base is fixed to the back plate by the adhesive layer;

wherein the base comprises a first bottom surface adjacent to the back plate, the first bottom surface is parallel to the top surface, and the first bottom surface comprises two parts with different widths.

2. The electronic device of claim 1, wherein the adhesive layer directly contacts a bottom surface of the base of the support module.

3. The electronic device of claim 1, wherein the base comprises a first hole offset from a center of the base.

4. The electronic device of claim 1, wherein the base comprises a first part and a second part, the support unit contacts the first part, and a hollow space is enclosed by the first part and the second part of the base.

5. The electronic device of claim 4, wherein the first part of the base comprises a curved structure.

6. The electronic device of claim 5, wherein the first part of the base comprises two protruding portions, and the support unit is located between the two protruding portions.

7. The electronic device of claim 1, wherein in a side view, the support unit has a first width at a top position away from the back plate and a second width at a bottom position closer to the back plate, and the second width is greater than the first width.

8. An electronic device, comprising:
a back plate;
an optical film disposed on the back plate; and
a support module disposed between the back plate and the optical film,
wherein the support module comprises a base and a support unit between the base and the optical film, the base comprises a first hole offset from a center of the base for fixing the support module to the back plate, and in a side view, the support unit has a first width at a top position away from the back plate and a second width at a bottom position closer to the back plate, and the second width is greater than the first width.

9. The electronic device of claim 8, wherein the base comprises a part with unequal widths.

10. The electronic device of claim 8, wherein the base comprises a second hole offset from the center of the base.

11. The electronic device of claim 8, wherein the base comprises a first part and a second part, the support unit contacts the first part, and a hollow space is enclosed by the first part and the second part of the base.

12. The electronic device of claim 11, wherein the first part of the base comprises a curved structure.

13. The electronic device of claim 12, wherein the first part of the base comprises two protruding portions, and the support unit is located between the two protruding portions.

* * * * *